2,798,526
TUBELESS TIRE

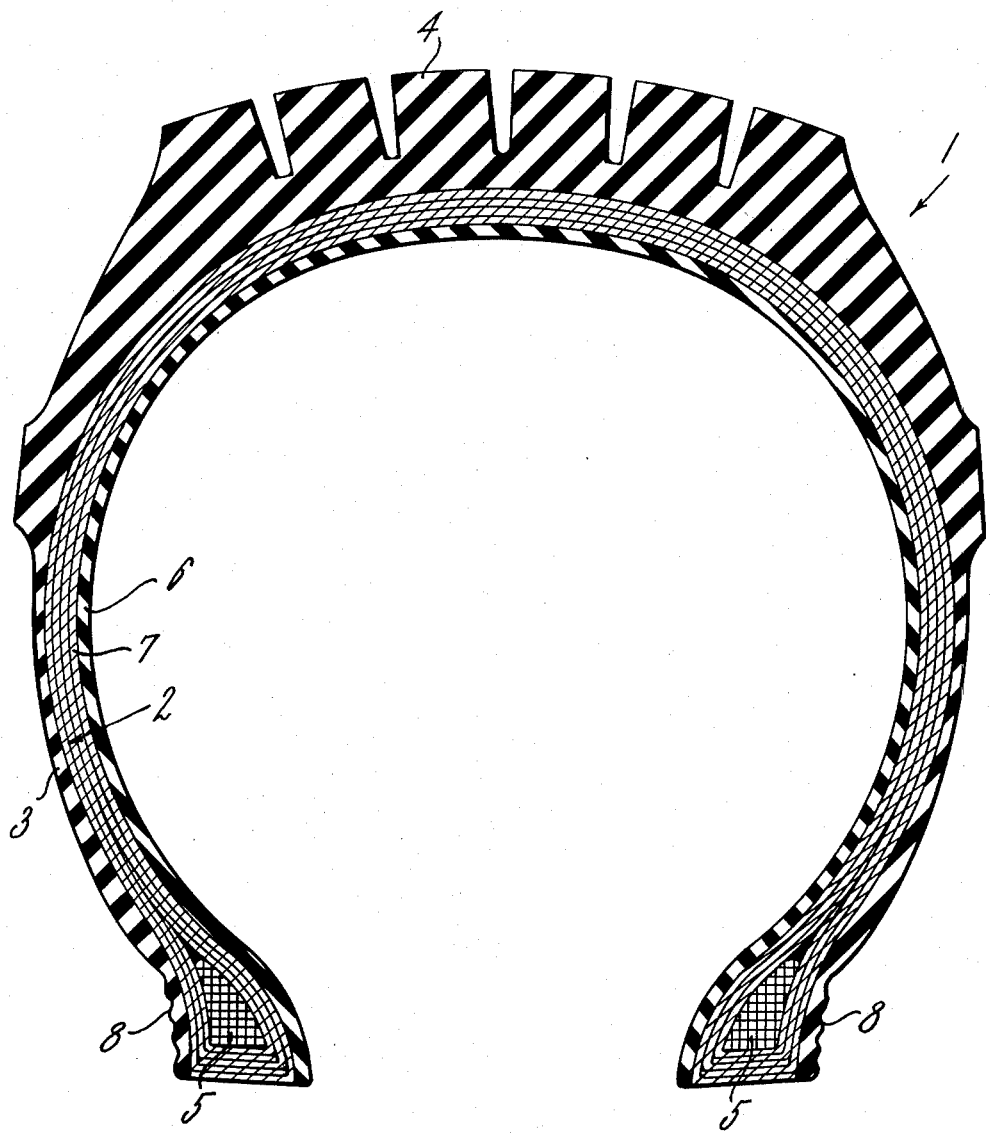

Lester C. Peterson and Harvey J. Batts, Indianapolis, Ind., assignors to United States Rubber Company, New York, N. Y., a corporation of New Jersey Application November 2, 1954, Serial No. 466,306

6 Claims. (Cl. 152—330)

This invention relates to a tubeless tire and more particularly to a tubeless tire exhibiting improved adhesion of a Butyl rubber-containing air retaining liner to the interior of the carcass.

In the accompanying drawing:

The single figure is a cross-sectional view of a tubeless tire made in accordance with our invention.

In the manufacture of tubeless tires it is conventional to use a liner made from Butyl rubber which is used because of its high impermeability to air. However, the matter of securing good adhesion of the Butyl rubber-containing linear to the rubberized inner face of the tire carcass has presented a serious problem. It has heretofore been proposed to overcome this problem by interposing a tie layer as an ahesive between the liner and the rubberized interior of the carcass. However, this involves manufacturing complications and the results have not always been as good as has been desired. In U. S. patent to Antonson 2,587,428 the problem of adhesion of an all-Butyl rubber liner was solved by rubberizing only the outer face of the innermost ply of fabric, leaving the inner face thereof uncoated so that during vulcanization the Butyl rubber liner adhered directly to the uncoated innermost fabric ply. However, this solution of the problem, requiring, as it does, the use of an innermost ply which is rubberized on one side only, has not attained commercial utilization to the best of our knowledge.

Our invention is based upon what we believe to be a new aproach to the problem of getting good liner-to-carcass adhesion in tubeless tire manufacture. More particularly, our invention resides in our discovery that the adhesion problem can be solved in a simple, highly effective and commercially feasible manner by modifying the composition of the rubber with which the innermost fabric ply of the tire carcass is coated. Still more particularly, our invention involves the incoporation of Butyl rubber reclaim with the rubber composition conventionally used for coating the innermost ply of fabric of the carcass so that the Butyl rubber-containing liner is adhered by vulcanization in situ to a layer formed of a mixture of ordinary rubber, either natural rubber or a butadiene-styrene rubbery copolymer (GR–S) or a mixture of the two, and a substantial amount of Butyl rubber reclaim.

In the practice of our invention, all of the plies of fabric used in the carcass can be rubberized, as by frictioning or "skim-coating" in known manner, with an uncured rubber composition comprising the ordinary rubber in admixture with Butyl rubber reclaim together with conventional vulcanizing ingredients for the rubber hydrocarbon content of the composition. In some cases we prefer to rubberize all of the fabric layers with the same composition because this greatly simplifies plant operations. As will be obvious, it is highly desirable in factory operation to have all of the rubberized plies which go into the carcass made in the same manner.

The advantages of our invention, insofar as the liner adhesion problem is concerned, can be attained by having only the inner face of the innermost ply of fabric coated with our special Butyl rubber reclaim-containing rubber mixture, the outer face of this innermost ply and both faces of the remaining plies being coated with the conventional carcass stock.

Our invention can also be practiced by having the innermost fabric ply rubberized on both sides with our Butyl rubber reclaim-containing rubber mixture and having the remaining plies made from conventional rubberized carcass fabric. In some ways this is to be preferred to the embodiment wherein the innermost ply is rubberized on the outer face with conventional carcass stock and on the inner face with our Butyl rubber reclaim-containing stock.

The inclusion of Butyl rubber reclaim in the stock used for rubberizing at least the inner face of the innermost fabric ply and preferably both faces of the innermost ply is not detrimental to the physical properties of the tire.

The amount of Butyl rubber reclaim employed in the mixture used for rubberizing at least the inner face of the innermost fabric ply in accordance with our invention can vary widely. We generally use such an amount as to furnish from 3 to 20 parts of Butyl rubber hydrocarbon per 100 parts of rubber hydrocarbon supplied by ordinary rubber (by which we mean natural rubber and/or GR–S, including both virgin materials and reclaimed natural rubber and GR–S). Especially good adhesion of the liner is obtained at levels of from 8 to 20 parts of Butyl rubber hydrocarbon supplied by Butyl rubber reclaim per 100 parts of rubber hydrocarbon supplied by natural rubber and/or GR–S and such levels are preferred.

The ordinary rubber used in admixture with Butyl rubber reclaim for rubberizing at least the inner face of the innermost fabric ply can consist of virgin natural rubber or GR–S or a mixture thereof or of a mixture of virgin natural rubber or GR–S, or a mixture thereof, with reclaimed natural rubber or GR–S. As will be obvious, for highest quality the amount of reclaimed natural rubber or GR–S used in such a mixture should be limited. For example, it is preferred that the natural rubber or GR–S reclaim not exceed about 30% of the total amount of natural rubber or GR–S or both.

In manufacturing tubeless tires in accordance with our invention we simply follow conventional factory procedures except that in place of the usual rubber composition used for frictioning the inner face of the innermost fabric ply, and preferably both faces of the innermost ply, we employ a formulation in which the rubber is furnished by natural rubber or GR–S or both and by Butyl rubber reclaim in suitable relative proportions. This rubberizing mixture of course contains conventional amounts of vulcanizing ingredients, usually sulfur and accelerators, and other curatives, notably zinc oxide and stearic acid, and any other desired compounding ingredients. We assemble the tire in the conventional manner from the rubberized fabric plies, tread stock, sidewall stock, beads, liner, etc., all of the rubber-containing parts being unvulcanized but vulcanizable, and vulcanize the entire assembly whereby all rubber-containing parts are simultaneously vulcanized. The vulcanization results in integral bonding and coalescence of the Butyl rubber-containing liner with the inner rubber-Butyl reclaim coating on the innermost ply of fabric and results in a remarkable degree of adhesion of the liner to the carcass.

The Butyl rubber reclaim and the natural rubber or GR–S (or both) used in making the rubber composition with which the innermost fabric ply is frictioned, are compatible with one another. In preparing to practice our invention, we typically simply mill the Butyl rubber reclaim and the natural rubber or GR–S together, adding conventional compounding ingredients, typically including suitable proportions of carbon black, sulfur in amounts sufficient to vulcanize the mixture, accelerators of vulcanization, and activators of acceleration, after which the mixture is frictioned or skim-coated onto the tire cord fabric using an ordinary rubber calender.

Any Butyl rubber-containing liner stock can be used in practicing our invention. However, we especially prefer that the liner be made from a mixture of Butyl rubber reclaim and natural rubber or GR–S or both in accordance with our copending application Serial No. 301,432, filed July 29, 1952 (now abandoned), which is directed to the use of such a liner made with from 55 to 70% of rubber hydrocarbon furnished by Butyl rubber reclaim and correspondingly from 45 to 30% of natural rubber or GR–S or both or in accordance with our copending application Serial No. 449,692, filed August 13, 1954, as a continuation-in-part of application Serial No. 301,432. The latter application discloses manufacture of the liner from a mixture of the same type as that covered in Serial No. 301,432 except that the relative proportions of Butyl rubber reclaim and the other rubber are such that the mixture contains from 30 to 70% of Butyl rubber hydrocarbon furnished by the Butyl rubber reclaim and correspondingly from 70 to 30% of rubber hydrocarbon furnished by the other rubber. The percentages just set forth are by weight based on the sum of the weights of rubber hydrocarbon furnished by the Butyl rubber reclaim and the rubber hydrocarbon furnished by the other rubber. To avoid undue repetition, the disclosures of said applications are hereby incorporated by reference.

In the drawing there is portrayed a pneumatic tubeless tire casing 1 comprised of a multi-ply rubberized fabric carcass 2 embodying four fabric plies, having overlying rubber sidewall and tread portions 3 and 4 respectively. Inextensible bead assemblies 5 are incorporated in the lower marginal portions of the carcass. A Butyl rubber-containing liner element 6 is securely attached to the entire inner portion of the rubberized inner face of the innermost fabric ply 7 by vulcanization in situ while being pressed against this innermost rubberized fabric layer during vulcanization of the tire in the factory. Preferably the outer sidewall portion of the bead is formed with a plurality of circumferential ridges 8 which aid in insuring a truly air-tight sealing against the wheel rim. If desired, auxiliary sealant means, in addition to ridges 8, can be provided to seal the tire with respect to the rim but neither ridges 8 nor such auxiliary sealant means constitute any part of our invention.

EXAMPLES

The following examples compare the adhesion of a natural rubber-Butyl rubber reclaim liner stock to a conventional tire fabric coat stock and to such a coat stock which has been modified by the incorporation of Butyl rubber reclaim in accordance with our invention.

The liner stock used in the following examples had the following composition:

Liner Stock

| | Parts |
|---|---|
| Smoked sheet natural rubber | 65.00 |
| Butyl rubber reclaim [1] | 63.63 |
| "Indopol H–300" [2] | 10.00 |
| "Philblack O" (high abrasion furnace black) | 50.00 |
| Zinc oxide | 5.00 |
| Stearic acid | 1.4 |
| "Monex" (tetramethyl thiuram monosulfide) | 0.35 |
| Sulfur | 0.65 |

[1] Furnishes 35 parts of Butyl rubber hydrocarbon.
[2] A non-migratory plasticizer consisting of polybutenes of relatively low molecular weight and having the following properties:

| | |
|---|---|
| Mean molecular weight | 940 |
| Sp. gr. 60°/60° F. | 0.894 |
| Flash point (Tag.), °F | 505 |
| Pour point (ASTM), °F | +35 |
| Viscosity, S. U. Sec. at 210° F. | 3330 |
| Refractive index (20/d) | 1.4959 |
| Iodine No | 32 |

The foregoing ingredients were mixed by ordinary rubber compounding techniques. The resulting mixture was sheeted out to form a liner.

Samples of the foregoing liner stock were cured while in contact with an uncured conventional natural rubber carcass stock of the type commonly used for coating tire fabric and in contact with similar stocks identical therewith except that they included varying amounts of Butyl rubber reclaim so as to show the effect of varying the proportion of Butyl rubber hydrocarbon supplied by the Butyl rubber reclaim upon the adhesion of the liner stock thereto.

The unmodified carcass stock had the following formulation:

Base carcass stock

| | Parts |
|---|---|
| Smoked sheet natural rubber | 100.00 |
| Whole tire reclaim | [1] 50.00 |
| Semi-reinforcing furnace black | 20.00 |
| Stearic acid | 2.00 |
| Pine tar | 3.00 |
| Anti-oxidant (acetone-diphenylamine condensation product known as "BLE") | 1.00 |
| Zinc oxide | 5.00 |
| Benzothiazyl disulfide ("Altax") | 0.75 |
| Sulfur | 3.50 |
| | 185.25 |

[1] Furnishes 26.00 parts natural rubber H. C.

The carcass stocks used in the examples had the following formulations. Example 1 is the control.

| Example | 1 | 2 | 3 | 4 | 5 |
|---|---|---|---|---|---|
| Above Carcass Stock | 185.25 | 185.25 | 185.25 | 185.25 | 185.25 |
| Butyl Rubber Reclaim [1] | | 5.75 | 11.50 | 23.00 | 34.50 |
| Parts Butyl Rubber H. C. (Supplied by Reclaim) per 100 parts natural rubber H. C. | | 2.37 | 4.75 | 9.50 | 14.25 |

[1] Contains approximately 52.3% Butyl rubber hydrocarbon.

The laminates of the foregoing liner stock and the unmodified and modified coat stocks were prepared and vulcanized at 350° F. in the conventional manner for 20 minutes. The adhesion of the liner layer of the resulting laminates to the coat stocks was measured at 250° F. in a Scott tester with jaws separating at 20 inches/minute.

The adhesion data on the resulting laminates were as follows:

| Example | 1 | 2 | 3 | 4 | 5 |
|---|---|---|---|---|---|
| Adhesion of liner at 250° F. to carcass stock, lbs | 19.0 | 20.5 | 27.0 | 43.0 | Over 50.[1] |
|  | 16.5 | 17.0 | 26.0 | 37.0 | Do. |
|  | 18.5 | 20.0 | 28.0 | 40.0 | Do. |
|  | 18.5 | 17.0 | 23.0 | 41.0 | Do. |
|  | 22.5 | 18.5 | 28.0 | 33.0 | Do. |
| Average | 19.0 | 19.0 | 26.5 | 39.0 | Do. |

[1] So high that the test specimens were destroyed in the test without separating the adhesion bond.

From the data it will be seen that the adhesion at the 4.75 part level is considerably better than for the control, that at the 9.5 part level the adhesion is extremely good and that at the 14.25 part level the adhesion was even better.

The term "Butyl rubber" is used herein in its ordinary sense to denote a sulfur-vulcanizable rubbery copolymer of a major proportion of isobutylene and a minor proportion of a multi-olefinic unsaturate having from 4 to 14 carbon atoms per molecule, the multi-olefinic unsaturate usually being an aliphatic conjugated diolefin hydrocarbon having from 4 to 6 carbon atoms per molecule, typically isoprene or butadiene, the proportions of combined monomers in the copolymer usually ranging from 90 to 99.5% of isobutylene and correspondingly from 10 to 0.5% of the multiolefinic unsaturate.

The term "Butyl rubber reclaim" is used herein in its ordinary sense to denote substantially fully reclaimed Butyl rubber which, as is well known in the rubber art, is made by treating vulcanized Butyl rubber in known manner so as to cause it to be devulcanized and attain a sufficiently plastic state to enable it to be formed into a continuous sheet and to be re-used in making vulcanized rubber articles. As is well-known, Butyl rubber reclaim is commonly made by heating ground Butyl rubber vulcanizate, almost invariably made by grinding Butyl rubber inner tubes, with water or steam in the presence of a reclaiming oil until it is softened and rendered sufficiently plastic to be reused like virgin rubber, after which it is sheeted out ready for sale. An example of such a process is shown in Randall U. S. Patent 2,545,828. Butyl rubber reclaim is a standard article of commerce and the method of making it is well-known and constitutes no part of the present invention. In preparing to make Butyl rubber reclaim it is common practice to carefully sort the original vulcanized articles and to rigidly exclude any made of natural rubber or GR-S. Therefore Butyl rubber reclaim contains substantially no natural rubber or GR-S reclaim. Butyl rubber reclaim usually contains about 50 to 62% of rubber hydrocarbon and 25 to 30% of carbon black. It usually has a specific gravity of 1.1 to 1.2, an ash content of 5 to 12% and an acetone extract of 3 to 6%.

Where reference is made herein to the rubber hydrocarbon furnished by the Butyl rubber reclaim, it will be understood that this has reference solely to the rubber hydrocarbon content of the reclaim and does not include any hydrocarbon oil or other non-rubber hydrocarbon component of the reclaim.

Having thus described our invention, what we claim and desire to protect by Letters Patent is:

1. A vulcanized tubeless pneumatic rubber tire comprising a carcass formed with plies of fabric coated with rubber selected from the group consisting of natural rubber and butadiene-styrene rubbery copolymers, said carcass having surrounding sidewall and tread portions, the innermost ply of fabric being coated on its inside face with a mixture of (1) rubber selected from said group and (2) substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be re-used in making vulcanized rubber articles, and an interior air retaining liner integrally secured to and coalesced with the inner rubber coating on said innermost ply by vulcanization in situ, said liner being formed of a continuous body of a vulcanized mixture comprising a rubbery copolymer of a major proportion of isobutylene and a minor proportion of an aliphatic conjugated diolefin hydrocarbon having from 4 to 6 carbon atoms per molecule.

2. A vulcanized tubeless pneumatic rubber tire comprising a carcass formed with plies of fabric coated with rubber selected from the group consisting of natural rubber and butadiene-styrene rubbery copolymers, said carcass having surrounding sidewall and tread portions, the innermost ply of fabric being coated on its inside face with a mixture of (1) rubber selected from said group and (2) substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be re-used in making vulcanized rubber articles, the amount of said reclaimed rubbery copolymer being such as to furnish from 3 to 20 parts of rubber hydrocarbon per 100 parts of rubber selected from said group, and an interior air retaining liner integrally secured to and coalesced with the inner rubber coating on said innermost ply by vulcanization in situ, said liner being formed of a continuous body of a vulcanized mixture comprising a rubbery copolymer of a major proportion of isobutylene and a minor proportion of an aliphatic conjugated diolefin hydrocarbon having from 4 to 6 carbon atoms per molecule.

3. A vulcanized tubeless pneumatic rubber tire comprising a carcass formed with plies of fabric coated with rubber, said carcass having surrounding sidewall and tread portions, the innermost ply of fabric being coated on both faces with a mixture of (1) rubber selected from the group consisting of natural rubber and butadiene-styrene rubbery copolymers and (2) substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be re-used in making vulcanized rubber articles, the amount of said reclaimed rubbery copolymer being such as to furnish from 3 to 20 parts of rubber hydrocarbon per 100 parts of rubber selected from said group, and an interior air retaining liner integrally secured to and coalesced with the inner rubber coating on the innermost ply of fabric by vulcanization in situ, said liner being formed of a continuous body of a vulcanized mixture comprising a rubbery copolymer of a major proportion of isobutylene and a minor proportion of an aliphatic conjugated diolefin hydrocarbon having from 4 to 6 carbon atoms per molecule.

4. A vulcanized tubeless pneumatic rubber tire comprising a carcass formed with plies of fabric coated with rubber selected from the group consisting of natural rubber and butadiene-styrene rubbery copolymers, said carcass having surrounding sidewall and tread portions, the innermost ply of fabric being coated on its inside face with a mixture of (1) rubber selected from said group and (2) substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be re-used in making vulcanized rubber articles, and an interior air retaining liner integrally secured to and coalesced with the inner rubber coating on said innermost ply by vulcanization in situ, said liner being formed of a continuous body of a vulancized mixture comprising substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be re-used in making vulcanized rubber articles, and an elastomer selected from the group consisting of natural rubber and butadiene-styrene rubbery copolymers in relative proportions of from 30 to 70% of rubber hydrocarbon furnished by said reclaimed rubbery copolymer and correspondingly from 70 to 30% of said selected elastomer, said percentages being based on the sum of the weights of rubber hydrocarbon furnished by said reclaimed rubbery copolymer and said selected elastomer.

5. A vulanczied tubeless pneumatic rubber tire comprising a carcass formed with plies of fabric coated with rubber selected from the group consisting of natural rubber and butadiene-styrene rubbery copolymers, said carcass having surrounding sidewall and tread portions, the innermost ply of fabric being coated on its inside face with a mixture of (1) rubber selected from said group and (2) substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be re-used in making vulcanized rubber articles, the amount of said reclaimed rubbery copolymer being such as to furnish from 3 to 20 parts of rubber hydrocarbon per 100 parts of rubber selected from said group, and an interior air retaining liner integrally secured to and coalesced with the inner rubber coating on said innermost ply by vulcanization in situ, said liner being formed of a continuous body of a vulcanized mixture comprising substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be reused in making vulcanized rubber articles, and an elastomer selected from the group consisting of natural rubber and butadiene-styrene rubbery copolymers in relative proportions of from 30 to 70% of rubber hydrocarbon furnished by said reclaimed rubbery copolymer and correspondingly from 70 to 30% of said selected elastomer, said percentages being based on the sum of the weights of rubber hydrocarbon furnished by said reclaimed rubbery copolymer and said selector elastomer.

6. A vulcanized tubeless pneumatic rubber tire comprising a carcass formed with plies of fabric coated with rubber, said carcass having surrounding sidewall and tread portions, the innermost ply of fabric being coated on both faces with a mixture of (1) rubber selected from the group consisting of natural rubber and butadiene-styrene rubbery copolymers and (2) substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be re-used in making vulcanized rubber articles, the amount of said reclaimed rubbery copolymer being such as to furnish from 3 to 20 parts of rubber hydrocarbon per 100 parts of rubber selected from said group, and an interior air retaining liner integrally secured to and coalesced with the inner rubber coating on the innermost ply of fabric by vulcanization in situ, said liner being formed of a continuous body of a vulcanized mixture comprising substantially fully reclaimed rubbery copolymer of a major proportion of isobutylene and a minor proportion of an aliphatic conjugated diolefin hydrocarbon having from 4 to 6 carbon atoms per molecule, said reclaimed rubbery copolymer having been made by heating a vulcanizate of said rubbery copolymer in the presence of a reclaiming oil until said vulcanizate is sufficiently plastic to enable it to be formed into a continuous sheet and to be re-used in making vulcanized rubber articles, and an elastomer selected from the group consisting of natural rubber and butadiene-styrene rubbery copolymers in relative proportions of from 30 to 70% of rubber hydrocarbon furnished by said reclaimed rubbery copolymer and correspondingly from 70 to 30% of said selected elastomer, said percentages being based on the sum of the weights of rubber hydrocarbon furnished by said reclaimed rubbery copolymer and said selected elastomer.

References Cited in the file of this patent

UNITED STATES PATENTS

| | | |
|---|---|---|
| 2,467,322 | Lightbown et al. | Apr. 12, 1949 |
| 2,541,550 | Sarbach et al. | Feb. 13, 1951 |
| 2,575,249 | Connell et al. | Nov. 13, 1951 |
| 2,676,636 | Sarbach | Apr. 27, 1954 |